US005581623A

United States Patent [19]

Ishimura et al.

[11] Patent Number: 5,581,623

[45] Date of Patent: Dec. 3, 1996

[54] ELECTROACOUSTIC TRANSDUCER AND METHOD OF FABRICATING THE SAME

[75] Inventors: Fumihito Ishimura; Yoshio Imahori; Takahiro Sone, all of Shizuoka; Yasuharu Tsuchiya, Shimizu, all of Japan

[73] Assignee: Star Micronics Co., Ltd., Shizuoka-ken, Japan

[21] Appl. No.: 319,714

[22] Filed: Oct. 7, 1994

[30] Foreign Application Priority Data

Oct. 25, 1993 [JP] Japan .................................... 5-288615

[51] Int. Cl.$^{6}$ .............................. H04R 25/00; H04Q 1/30

[52] U.S. Cl. .......................... 381/192; 381/194; 381/205; 340/311.1

[58] Field of Search .................................... 381/192, 199, 381/202, 205, 188, 194, 152, 200, 195; 340/388.1, 391.1, 825.44, 311.1; 367/175, 185

[56] References Cited

U.S. PATENT DOCUMENTS 5,394,479 2/1995 Ishigaya et al. ........................ 381/192

5,432,758 7/1995 Sone ........................................ 381/202

*Primary Examiner*—Sinh Tran

*Attorney, Agent, or Firm*—Pollock, Vande Sande & Priddy

[57] ABSTRACT

The present invention provides an electroacoustic transducer and a method of fabricating the same, employing a lead frame to integrally form a plurality of component parts, thus reducing the number of individual component parts, and improving assembly efficiency. The electroacoustic transducer comprises a base, a yoke fixed to the base, a core, a coil wound around the core, magnet surrounding the coil, a support ring surrounding the magnet, a vibrating plate supported on the support ring, lead terminals fixed to the base, and a case having a sound emitting cylinder and joined to the base so as to cover those components. A gap is formed between the core and the diaphragm. The diaphragm, the gap, the core, the yoke and the magnet form a closed magnetic path. The coil drives the diaphragm for vibration when energized. The yoke and the lead terminals are integrally formed of a common metal material such as the lead frame. The core may be integrally formed with the yoke of the lead frame.

9 Claims, 12 Drawing Sheets

ELECTROACOUSTIC TRANSDUCER AND METHOD OF FABRICATING THE SAME

BACKGROUND OF THE INVENTION

1. Field of the Invention

The present invention relates to an electroacoustic transducer for converting electric input signals into sound, and a method of fabricating the same.

2. Description of the Prior Art

Electroacoustic transducers are employed in various miniature electronic devices, such as card-shaped portable pagers. Miniaturization of electroacoustic transducers to be incorporated into such miniature electronic devices has been requested and efforts have been made for the further miniaturization of the component parts of electroacoustic transducers.

FIGS. 14 and 15 show a conventional electroacoustic transducer. The construction of and a method of fabricating this conventional electroacoustic transducer will be described. A cylindrical upper case 102 and a cylindrical lower case 104 are formed individually of a synthetic resin by molding. A yoke 106 is attached to the lower side of the lower case 104 and a base plate 108 is attached adhesively to the lower surface of the yoke 106. A core 110 has a lower end fixedly inserted in a hole formed coaxially through the yoke 106 and the base plate 108. A coil 112 is mounted on the core 110, and an annular magnet 114 is disposed so as to surround the coil 110. Leads 116 and 118 of the coil 112 extend outside from the back side of the base plate 108 and are soldered to electrodes 120 and 122 formed on the base plate 108, respectively. The yoke 106, the core 110 and the magnet 114 form an electromagnetic transducing portion 126 for driving a diaphragm 124.

The lower case 104 has a supporting stepped portion 128 near the upper open end thereof on the inner surface thereof, and a large diameter portion 130 formed at the upper open end of the lower case 104 to form the supporting stepped portion 128. The diaphragm 124 is seated on the supporting stepped portion 128. A magnetic piece 132 is attached to the central portion of the diaphragm 124 to increase the vibrating mass of the diaphragm 124.

An engaging portion 134 of the upper case 102 is fitted in the large diameter portion 130 of the lower case 104, and the upper case 102 and the lower case 104 are joined together in an integral unit by joining means, such as ultrasonic welding. Thus, a resonance space 136 that resonates with the vibration of the diaphragm 124 is formed in the upper case 102 to produce an appropriate sound pressure. A sound emitting cylinder 140 coaxially having a through hole 138 projects into the resonance space 136 from the inner surface of the top wall of the upper case 102.

This electroacoustic transducer has a basic construction for converting electric input signals into sound and comprises a comparatively large number of independent component parts. Accordingly, the electroacoustic transducer must be assembled very carefully because the characteristics of the electroacoustic transducer including a sound output characteristic are greatly dependent on the accuracy of alignment of the component parts, particularly that of alignment of the diaphragm 124 and the magnet 114.

SUMMARY OF THE INVENTION

Accordingly, it is an object of the present invention to provide an electroacoustic transducer and a method of fabricating the same, employing a lead frame to integrally form a plurality of component parts, thus reducing the number of individual component parts, and improving assembly efficiency.

With the foregoing object in view, the present invention provides an electroacoustic transducer for converting electric input signals into sound, comprising a base formed of a synthetic resin in the shape of a flat plate, a case joined to the base and integrally provided with a sound emitting cylinder, a yoke formed of a metal and fixed to the upper surface of the base and covered with the case. Also included is a core formed on the upper surface of the yoke, a coil wound around the core, an annular magnet disposed so as to surround the coil, a support ring disposed on the base so as to surround the magnet, a diaphragm of magnetic material supported on the support ring so as to form a gap between the diaphragm and the core. The diaphragm forms a closed magnetic path via the gap with the core, yoke and magnet, and being vibrated by excitation of the coil, and lead terminals formed of the same material as the yoke, fixed to the base, connected to ends of the coil and projecting outside from the base.

The present invention provides also a method of fabricating an electroacoustic transducer for converting electric input signals into sound, the method comprising forming lead terminals and a yoke of a lead frame and forming a core integrally with the yoke, forming a base of a synthetic resin on the lead frame by molding so that the yoke and the lead terminals are fixed to the base, winding a coil around the core formed integrally with the yoke, and connecting ends of the coil to the lead terminals. The winding and connecting is carried out on the lead frame, mounting a support ring on the yoke, fitting a magnet in the support ring and placing a diaphragm on the support ring, the mounting, fitting and placing being carried out on the lead frame, positioning a case on and fixedly joining the same to the base. The positioning is carried out on the lead frame, and cutting tie bars of the lead frame extending from the yoke and the lead terminals to separate the electroacoustic transducer from the lead frame.

Since the leads and the yoke of the electroacoustic transducer in accordance with the present invention are formed integrally of the lead frame, the electroacoustic transducer comprises a reduced number of component parts and can be easily assembled, and other component parts can be located in a high accuracy.

In the method of fabricating the electroacoustic transducer in accordance with the present invention, the lead terminals and yoke are formed integrally of the lead frame, the base of synthetic resin is formed on the lead frame, and then lead terminals and yoke combined with the base by insert molding into a single unit. This considerably increases positional accuracy of the lead terminals and yoke on the base compared to the conventional art where they are individual parts, and also reduces the number of parts to be assembled since the three components, that are lead terminals, yoke and base, are unified in the single lead frame.

Forming the core integrally with the yoke would further reduce the number of parts and eliminates the need of assembly so as to increase positional accuracy as well as work efficiency.

A plurality electroacoustic transducers can be assembled on a lead frame by forming a plurality of bases on the lead frame by insert molding, mounting component parts on the bases and joining a plurality of cases to the bases, respectively, on the lead frame. Those electroacoustic transducers assembled on a single lead frame can be transported in a unit. All the steps of the method of fabricating the electroacoustic transducer can be carried out by a continuous production system in a high efficiency.

The above and other objects, features and advantages of the present invention will become more apparent from the following description taken in connection with the accompanying drawings.

DETAILED DESCRIPTION OF THE PREFERRED EMBODIMENTS

Figure 1:
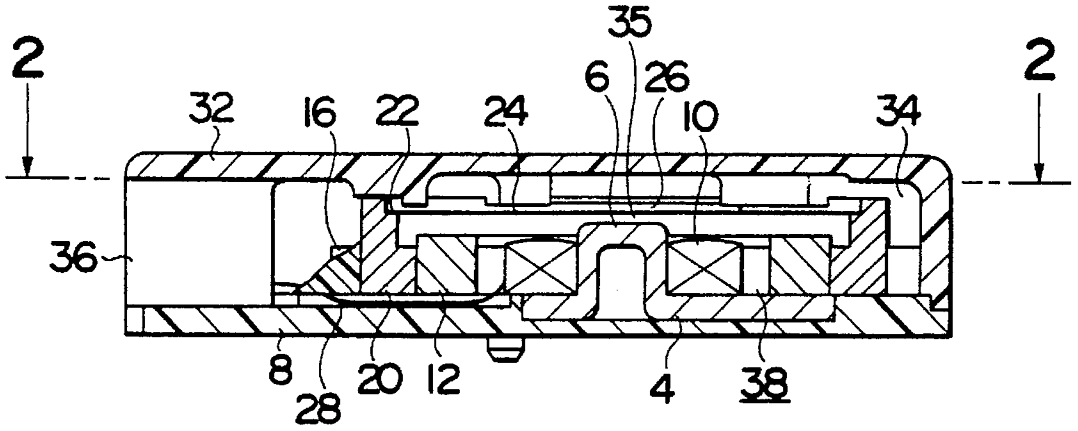
FIG. 1 is a longitudinal sectional view of an electroacoustic transducer in a first embodiment according to the present invention.
Figure 2:
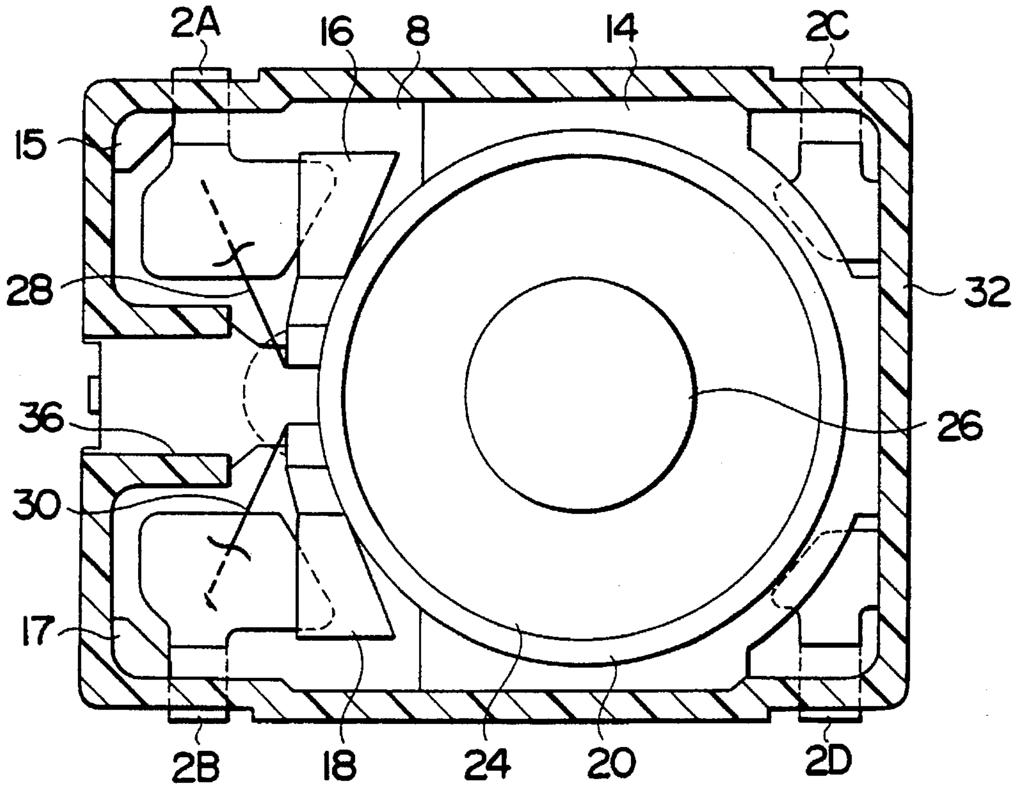
FIG. 2 is a sectional plan view taken on line A—A in FIG. 1.

Referring to FIGS. 1 and 2 showing an electroacoustic transducer in a first embodiment according to the present invention, lead terminals 2A, 2B, 2C and 2D, and a yoke 4 are integrally formed of a lead frame. A core 6 is integrally formed with the yoke 4 at its central portion. The lead terminals 2A, 2B, 2C and 2D and the yoke 4 are embedded in a base 8 formed of a synthetic resin in the shape of a rectangular flat plate.

A coil 10 is wound around the core 6, and an annular magnet 12 is disposed so as to surround the coil 10. The yoke 4 and the magnet 12 are magnetically coupled to form a magnetic path. The coil 10 may be wound around a bobbin after or before the bobbin is mounted on the core 6.

The base 8 is provided on its upper surface with positioning protrusions 14, 15, 16, 17 and 18. A support ring 20 is positioned inside the positioning protrusions 14, 16 and 18 on the base 8. The support ting 20 has a stepped portion 22 on its inner surface at a position near the upper end thereof, and a diaphragm 24 is seated on the stepped portion 22 of the support ring 20. A magnetic piece 26 is attached to the central portion of the diaphragm 24 to increase the vibrating mass of the diaphragm 24.

Opposite ends 28 and 30 of the coil 10 are pulled outside along the lower surface of the magnet 12 and via a space between the positioning protrusions 16 and 18, and soldered to the lead terminals 2A and 2B, respectively.

A synthetic resin case 32 is positioned in place on the base 8 by the positioning protrusions 14, 16 and 18, and the case 32 is fixed to the base 8 by a fixing means, such as ultrasonic welding. The case 32 defines a resonance space 34 extending over the surface of the diaphragm 24 and around the support ring 20. The case 32 is provided on one side wall thereof with a sound emitting cylinder 36 by means of which the resonance space 34 communicates with the atmosphere.

A gap 35 is formed between the core 6 and the diaphragm 24 supported on the support ring 20. A closed magnetic path is formed through the diaphragm 24, the gap 35, the core 6, the yoke 4, and the magnet 12.

In this electroacoustic transducer, the yoke 4 having the core 6 and combined with the base 8 by insert molding, the coil 10 and the magnet 12 constitute an electromagnetic transducing portion 38. When an ac signal is applied across the lead terminals 2A and 2B, the coil 10 is excited and creates an alternating magnetic field between the core 6 and the diaphragm 24 provided with the magnetic piece 26 and, consequently, the diaphragm 24 vibrates to generate sound, the resonant space 34 resonates and the sound is radiated outside the case 32 through the sound emitting cylinder 36. The resonation of the resonant space 34 causes the base 8 and the case 32 to vibrate and generate sounds.

Since the lead frame is employed to integrally form the lead terminals 2A and 2B and the yoke 4, the electroacoustic transducer comprises a comparatively small number of component parts, can be efficiently assembled by a reduced number of assembling steps, and can be formed in a flat, compact construction. The support ring 20 is formed of a metal, such as brass, separately from the base 8, which enhances the accuracy of the support ring 20, moderates demand for the molding accuracy of the base 8, and improves the yield of the electroacoustic transducer fabricating process.

A method of fabricating the electroacoustic transducer in the first embodiment according to the present invention will be described hereinafter with reference to FIGS. 3 to 10.

a. Lead Frame Forming Step

Figure 3:
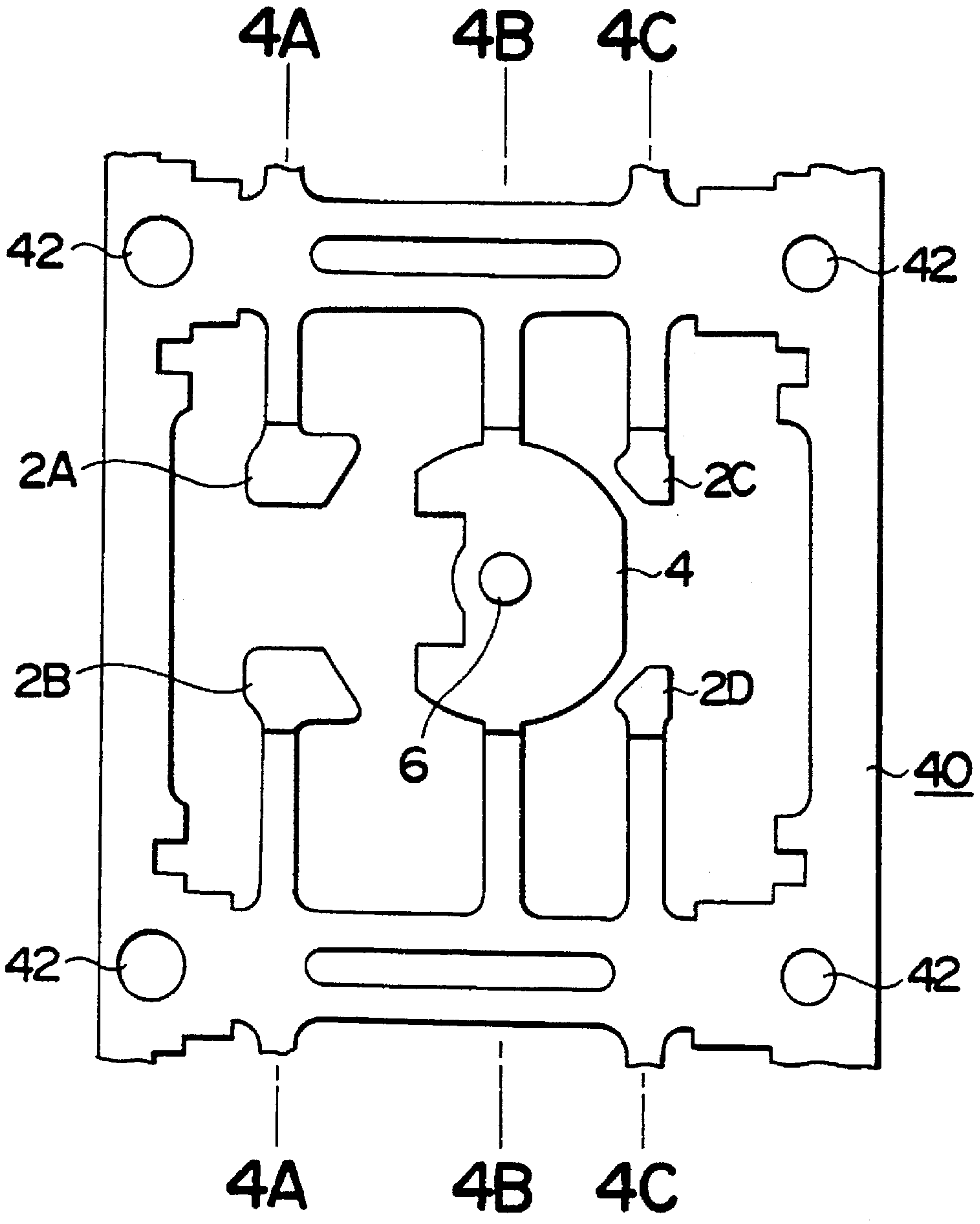
FIG. 3 is a fragmentary plan view of a lead frame employed in fabricating the electroacoustic transducer of FIG. 1.
Figure 4A:
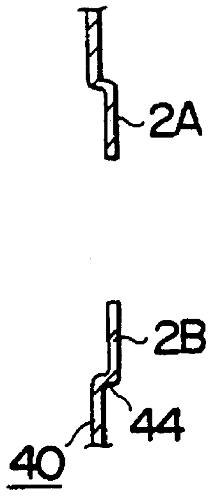
FIG. 4A is a sectional view taken on line 4A—4A in FIG. 3.
Figure 4B:
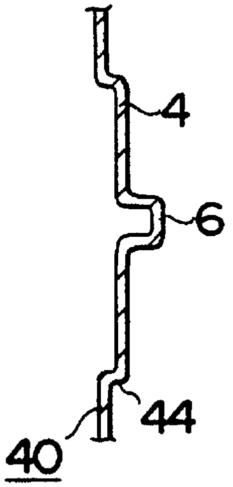
FIG. 4B is a sectional view taken on line 4B—4B in FIG. 3.
Figure 4C:
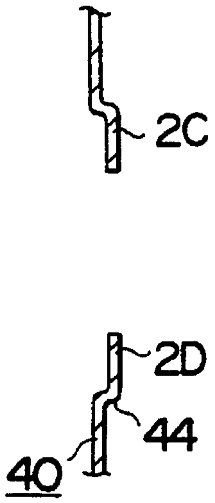
FIG. 4C is a sectional view taken on line 4C—4C in FIG. 3.

Referring to FIG. 3, the lead frame 40 is a strip of a magnetic material, such as a steel strip, and is coated with solder. The lead frame 40 has opposite side bars provided with locating holes 42. The yoke 4 is formed at the middle between the opposite side bars and provided with the core 6 in the central portion thereof, and the lead terminals 2A, 2B, 2C and 2D are formed around the yoke 4. As shown in FIGS. 4A, 4B and 4C, the yoke 4, the lead terminals 2A, 2B, 2C and 2D are raised by a small step 44 from a plane including the side bars. The lead frame 40 need not be formed by a single forming cycle but may be formed by a plurality of forming cycles, in which the lead frame 40 is located by means of the locating holes 42.

b. Base Forming Step

Figure 5:
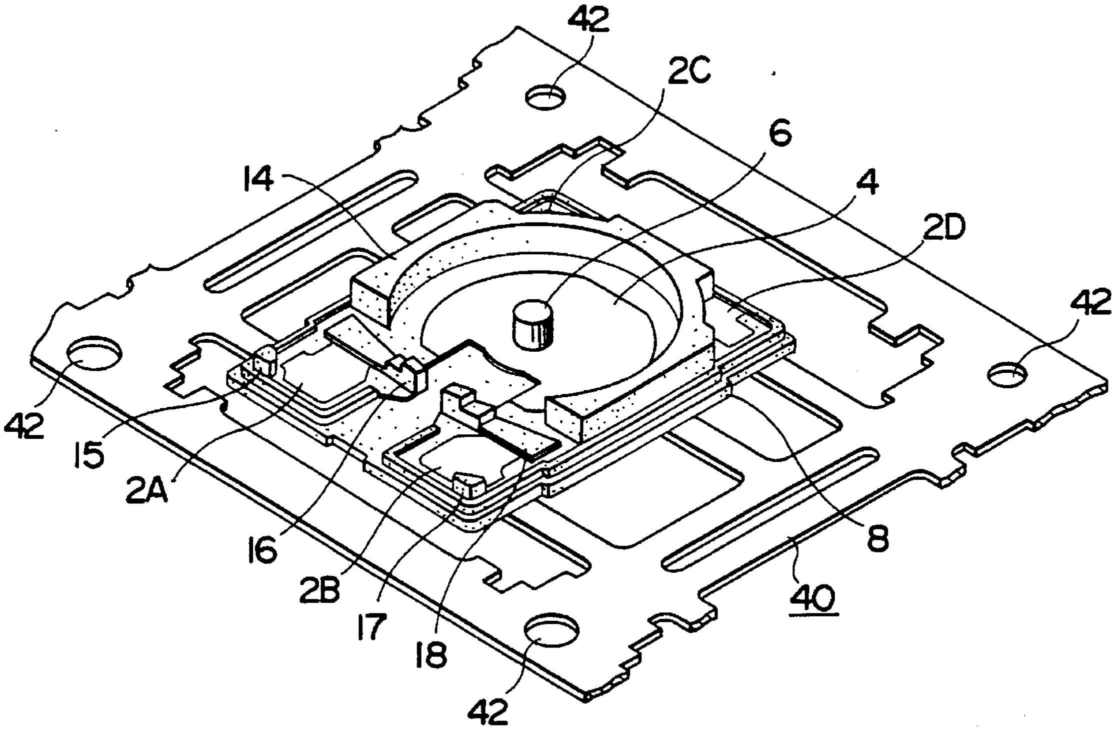
FIG. 5 is a perspective view of the partially fabricated electroacoustic transducer of FIG. 1 after a step of forming a base on the lead frame of FIG. 3.

The base 8 is combined with the lead frame 40 as shown in FIG. 5 by insert molding, in which the lead frame 40 is held in a mold, and a molten synthetic resin is poured into the mold to form the base 8 over the yoke 4 and the lead terminals 2A, 2B, 2C and 2D so that the upper surface of the yoke 4, and the upper portions of the lead terminals 2A, 2B, 2C and D to be subjected to soldering exposed on the base 8.

c. Coil Forming Step

Figure 6:
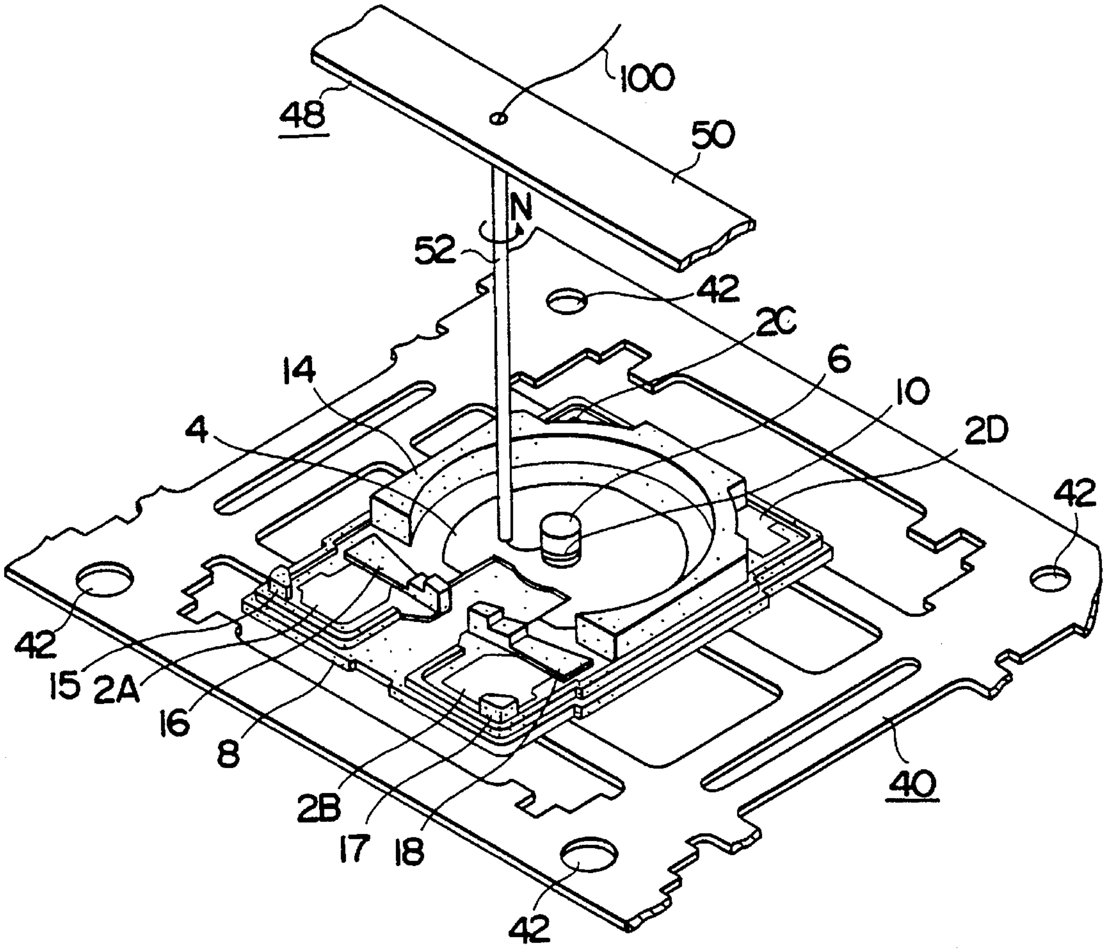
FIG. 6 is a perspective view of the partially fabricated electroacoustic transducer of FIG. 1 in a step of forming a coil on the lead frame of FIG. 3.

Referring to FIG. 6, the coil 10 is wound around the core 6 of the lead frame 40 by a coil winding device 48 having an arm 50 and a guide pipe 52 attached to the arm 50. When winding the coil 10, a wire 100 is guided to the core 6 by the guide pipe 52, and then the arm 50 is revolved in the direction of the arrow N. The leading end of the wire 100 is soldered, for example, to the lead terminal 2A, and the trailing end of the wire 100 is soldered to the lead terminal 2B after the coil 10 has been wound around the core 6.

d. Support Ring, Magnet and Diaphragm Mounting Step

Figure 7:
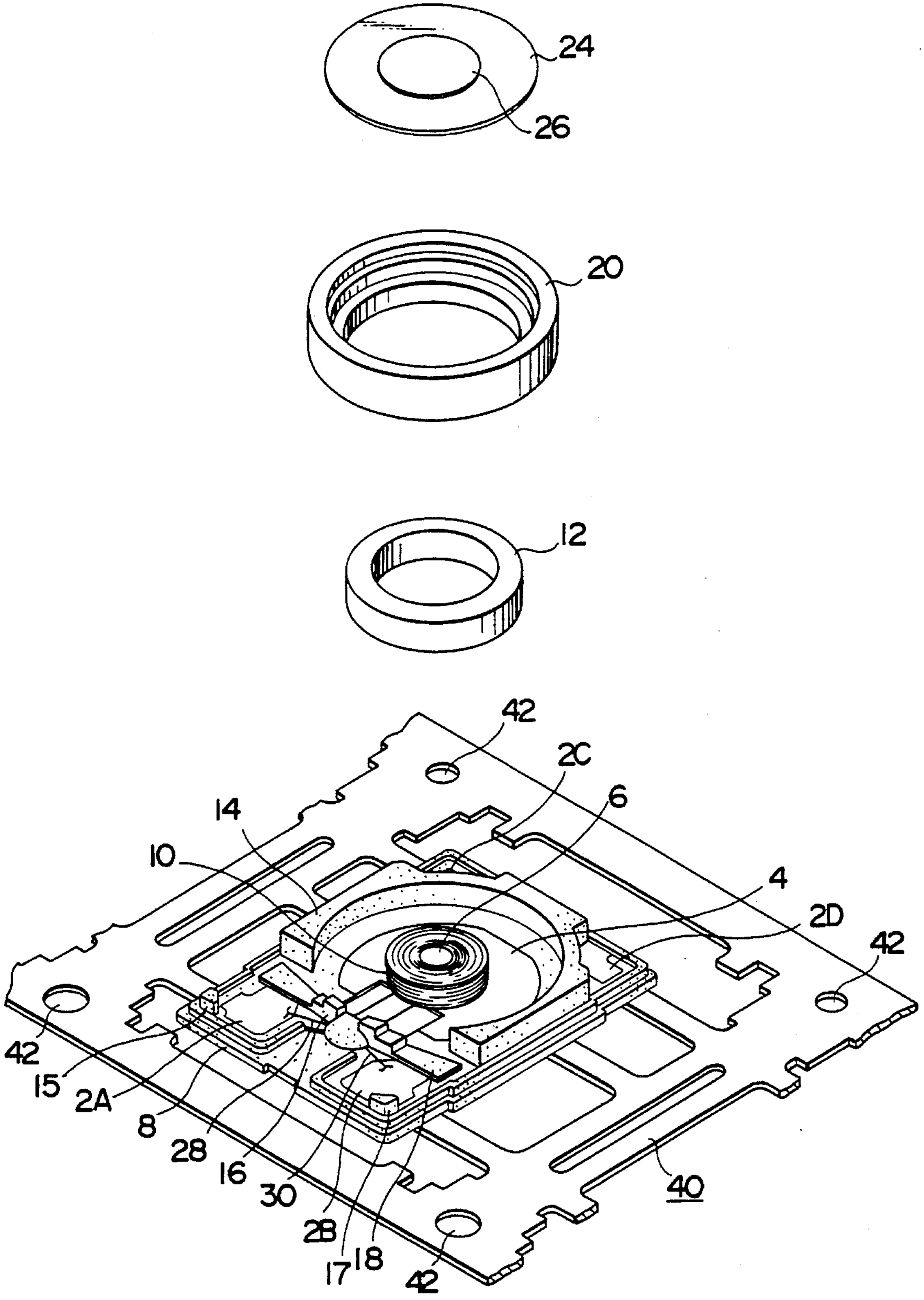
FIG. 7 is a perspective view of the partially fabricated electroacoustic transducer of FIG. 1 in a step of mounting a magnet, a support ring and a diaphragm on the base formed on the lead frame of FIG. 3.

Referring to FIG. 7, the support ring 20, the magnet 12 and the diaphragm 24 are formed separately, the support ring 20 is fitted in a space defined by the positioning protrusion 14 of the base 8 and is attached adhesively to the base 8, the magnet 12 is fitted in the support ring 20, and then the diaphragm 24 is put on the support ring 20.

e. Case Fitting Step

Figure 8:
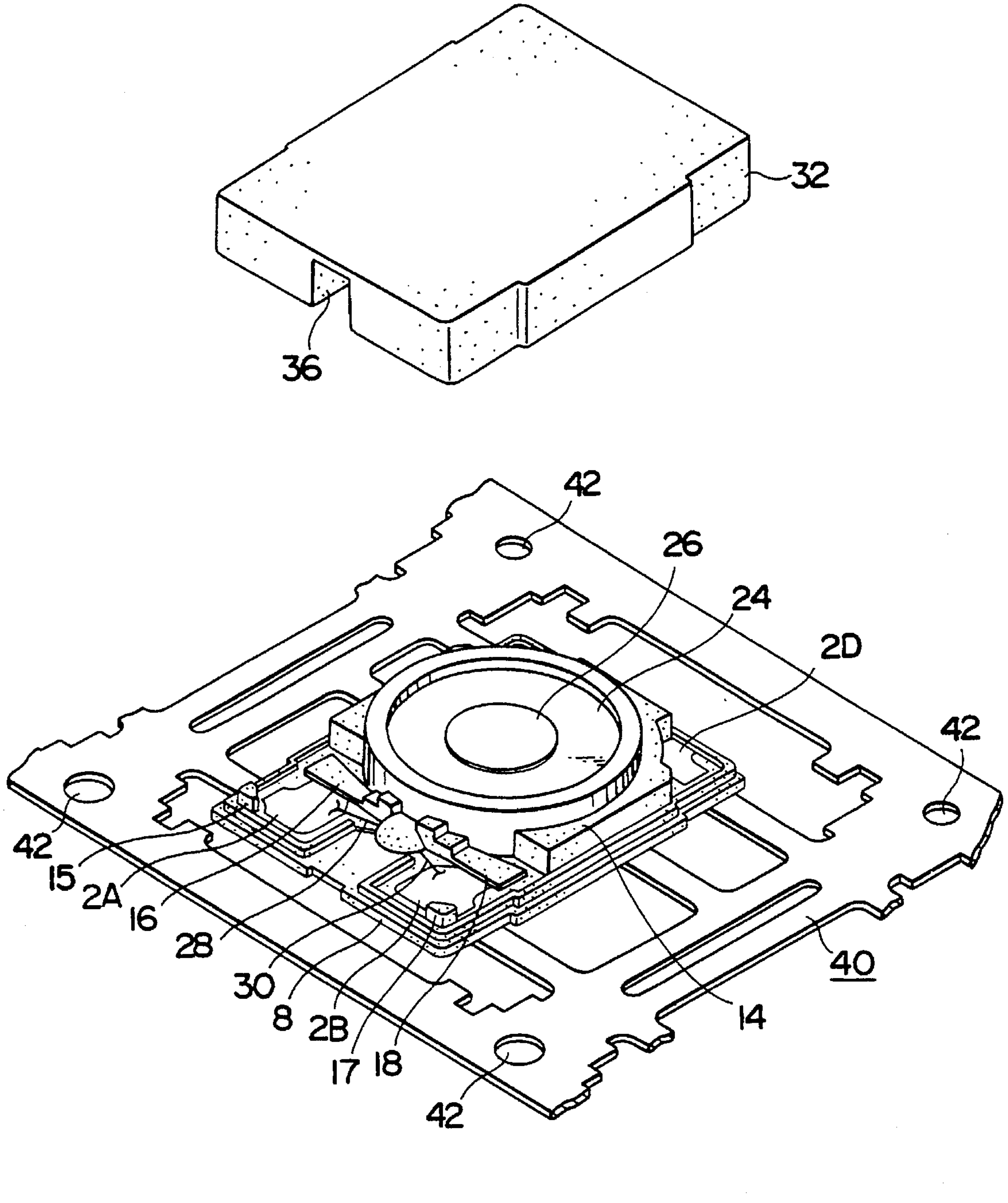
FIG. 8 is a perspective view of the partially fabricated electroacoustic transducer of FIG. 1 in a step of putting a case on the base formed on the lead frame of FIG. 3.
Figure 9:
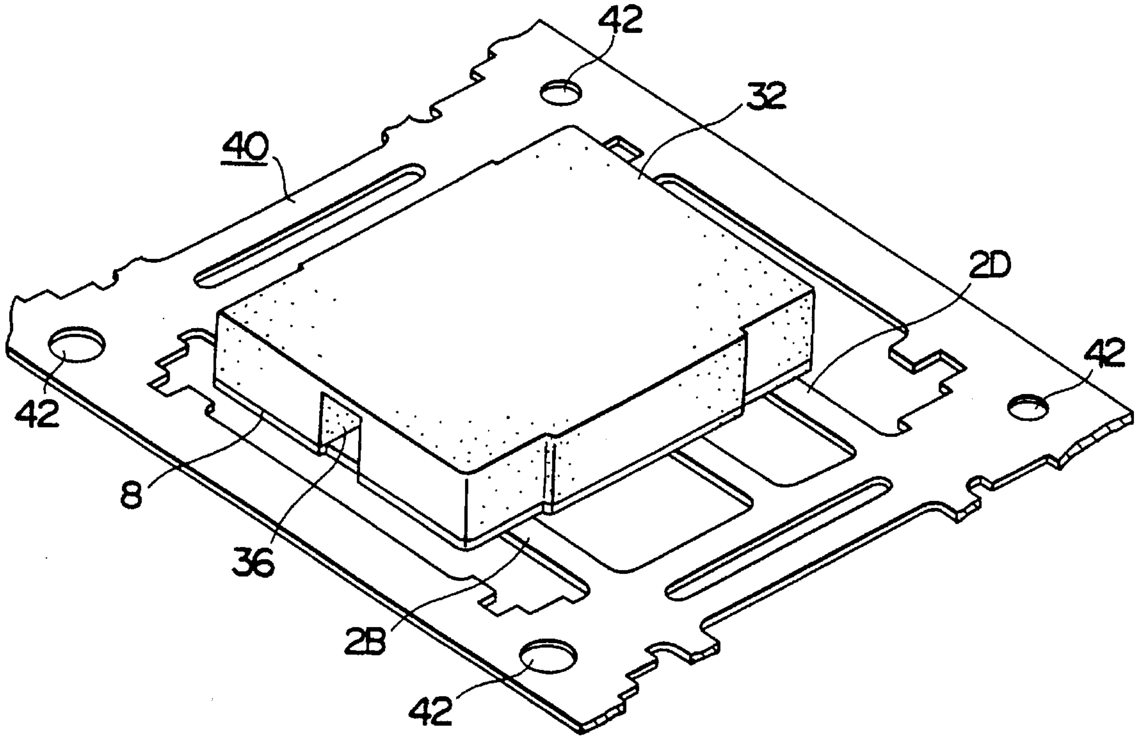
FIG. 9 is a perspective view of the electroacoustic transducer of FIG. 1 formed on the lead frame of FIG. 3.

Referring to FIGS. 8 and 9, the case 32 formed of a synthetic resin by a molding process is joined to the base 8 formed on the lead frame 40 by ultrasonic welding to complete assembling the electroacoustic transducer on the lead frame. The case 32 may be attached adhesively to the base 8 with an adhesive. A plurality of such electroacoustic transducers are assembled on the lead frame.

f. Lead Frame Cutting Step

Figure 10:
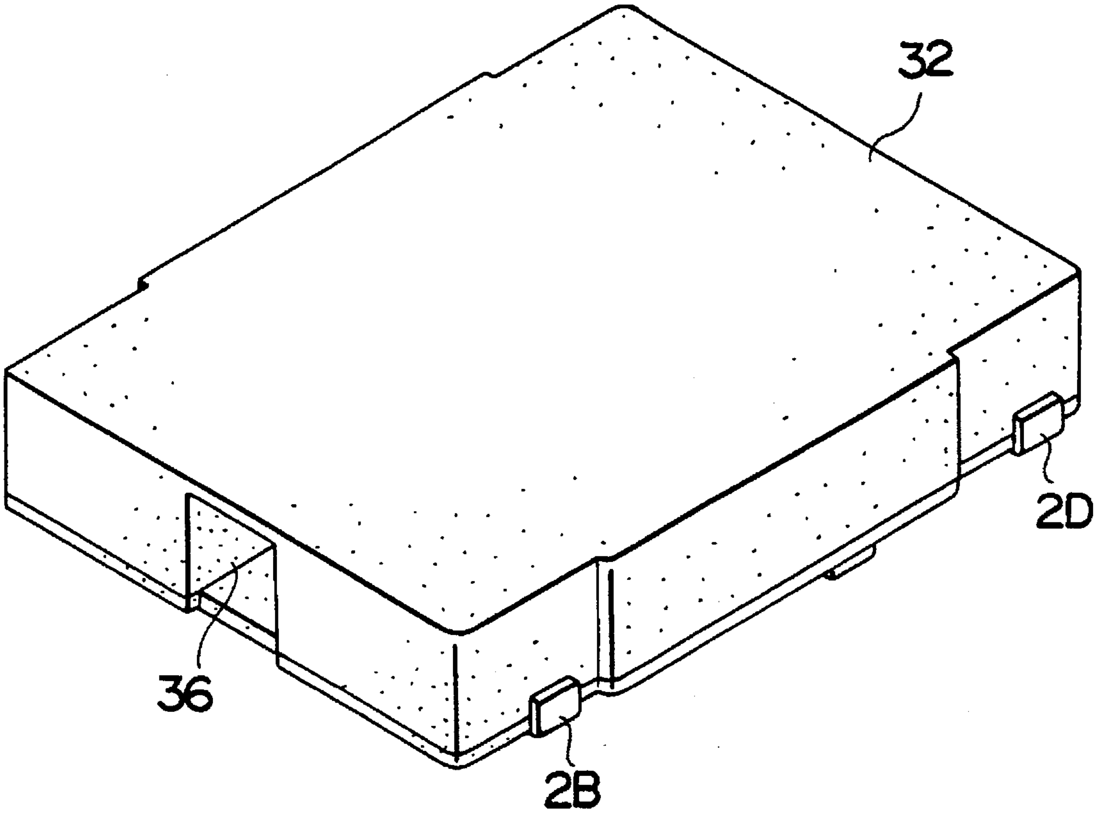
FIG. 10 is a perspective view of the electroacoustic transducer of FIG. 1 separated from the lead frame of FIG. 3.

Tie bars extending from the yoke 4, and the lead terminals 2A, 2B, 2C and 2D are cut to separate the electroacoustic transducer from the lead frame 40, and then the free ends of the lead terminals 2A, 2B, 2C and 2D projecting outside the base 8 are bent as shown in FIG. 10 to complete the electroacoustic transducer.

Since the lead frame 40 is used to integrally form the yoke 4 and the lead terminals 2A to 2D, and the base 8 and the lead frame 40 are combined by insert molding, a reduced number of component parts needs to be assembled, so that the electroacoustic transducer can be easily assembled by simple assembling work.

Figure 11:
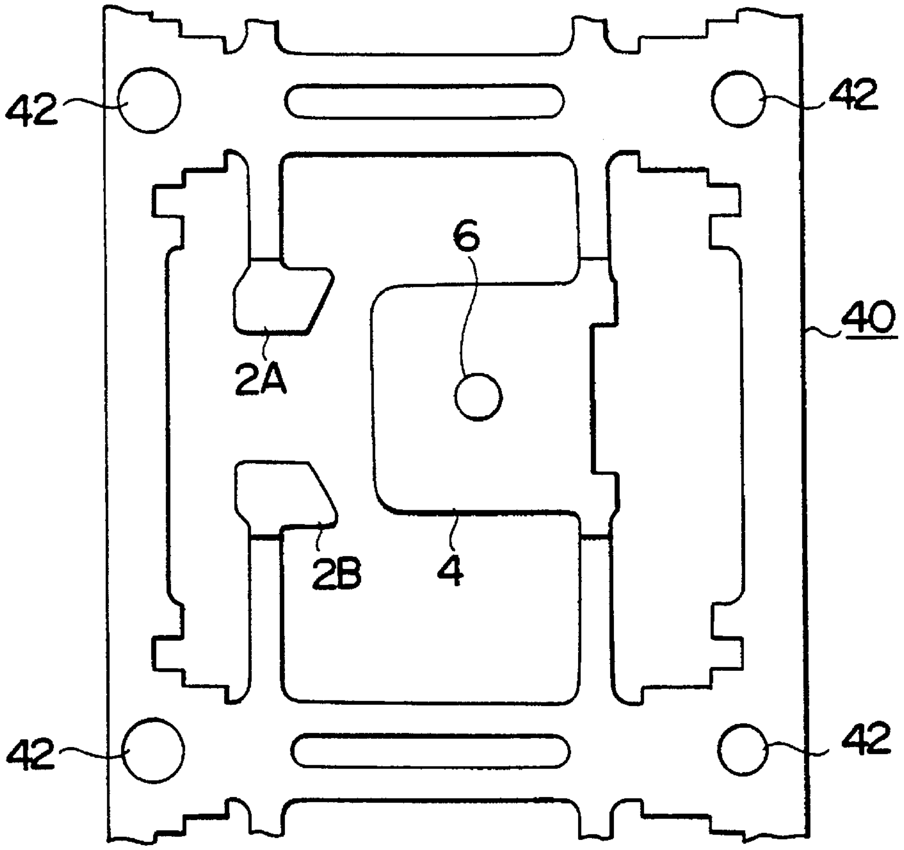
FIG. 11 is a fragmentary plan view of a lead frame employed in fabricating an electroacoustic transducer in a second embodiment according to the present invention.

The auxiliary lead terminals 2C and 2D may be omitted; a lead frame 40 having a yoke 4 provided with a core 6 and only lead terminals 2A and 2B as shown in FIG. 11 may be used.

Figure 12:
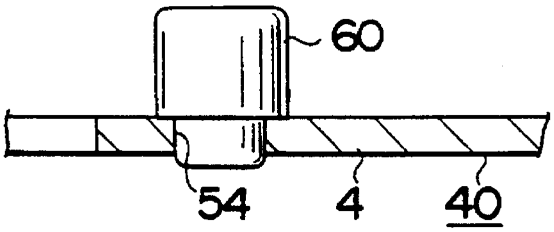
FIG. 12 is a sectional view of a portion of the lead frame of FIG. 11.
Figure 13:
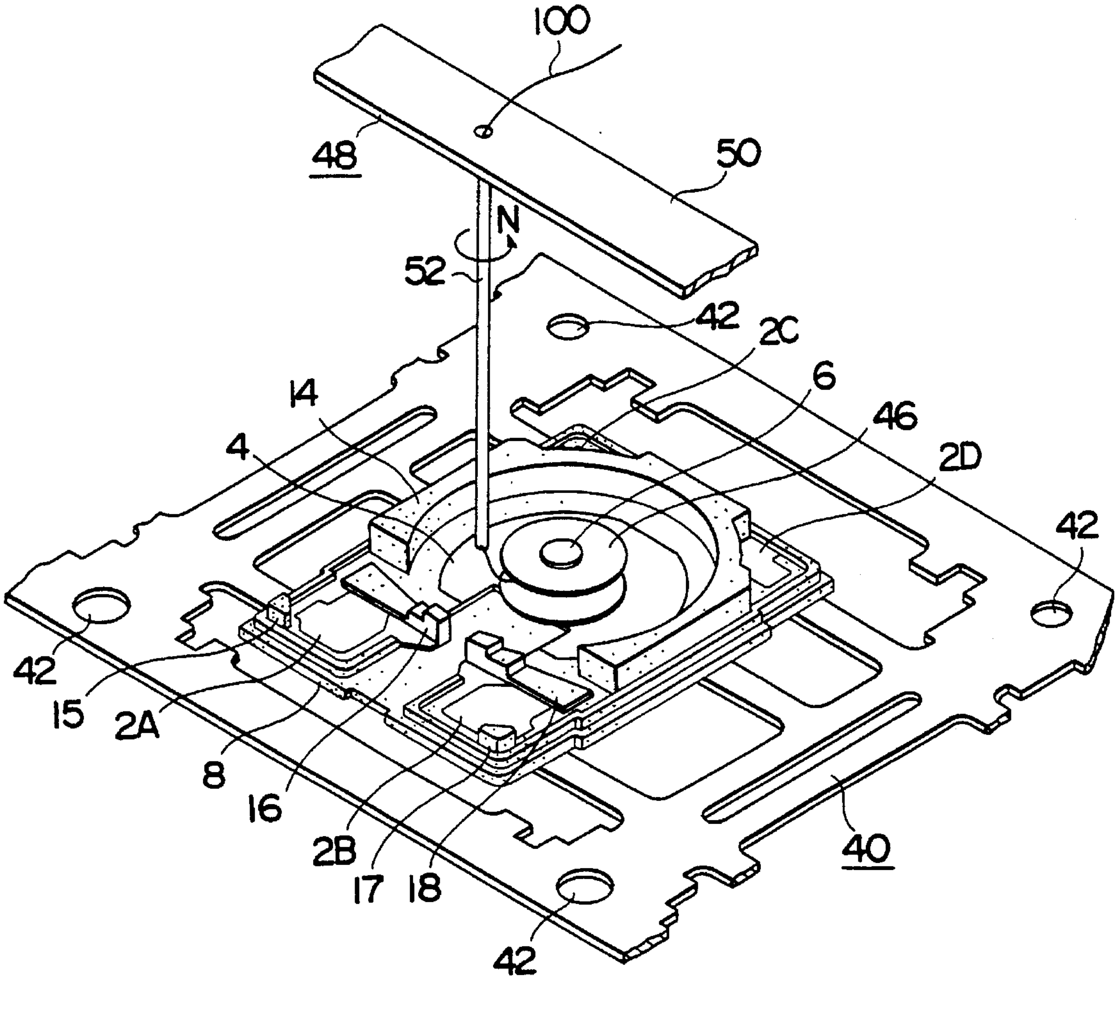
FIG. 13 is a perspective view of the partially fabricated electroacoustic transducer of FIG. 11 in a step of winding a wire around a bobbin to form a coil on the lead frame of FIG. 11.
Figure 14:
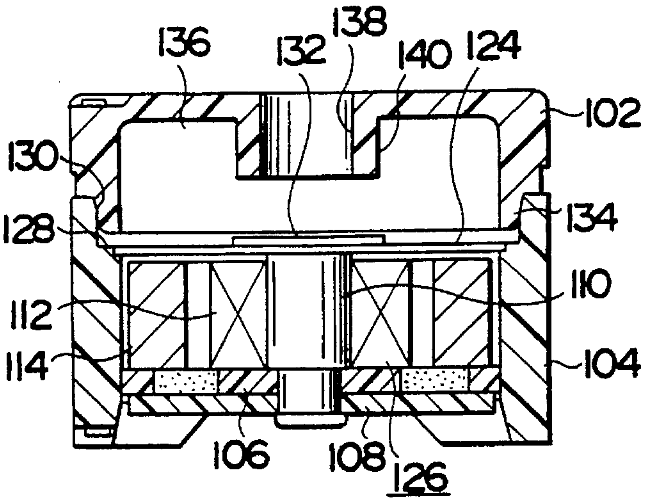
PRIOR ART FIG. 14
FIG. 14 is a longitudinal sectional view of a conventional electroacoustic transducer.
Figure 15:
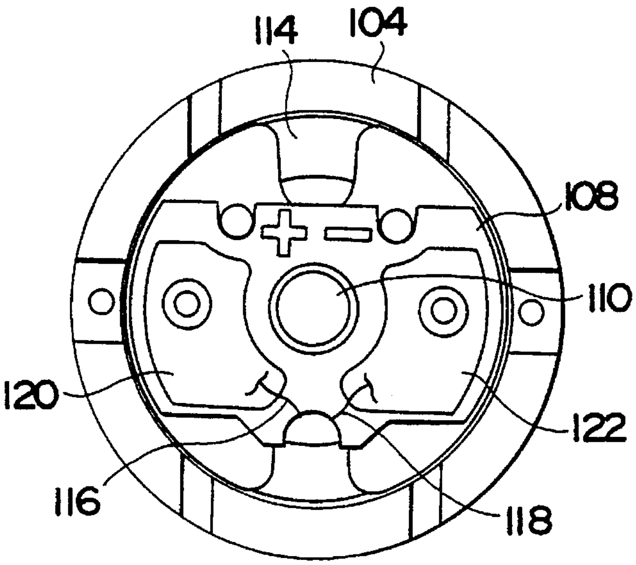
PRIOR ART FIG. 15
FIG. 15 is a bottom view of the electroacoustic transducer of FIG. 14.

The core 6 need not necessarily be formed integrally with the yoke 4. A core 60 formed separately from the yoke 4 may be fitted in a forced fit in a through hole 54 formed in the yoke 4 as shown in FIG. 12.

The coil 10 may be wound around a bobbin 46 mounted on the core 6 instead of directly winding the coil 10 around the core 6. Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An electroacoustic transducer for converting electric signals externally applied to lead terminals into sound, comprising:

a base formed of a synthetic resin in the shape of a flat plate;

a case joined to the base and integrally provided with a sound emitting cylinder;

a yoke formed of a metal and fixed to the upper surface of the base and covered with the case;

a core formed on the upper surface of the yoke;

a coil wound around the core;

an annular magnet disposed so as to surround the coil;

a support ring disposed on the base so as to surround the magnet;

a diaphragm of magnetic material supported on the support ring so as to form a gap between the diaphragm and the core, said diaphragm forming a closed magnetic path via the gap with the core, yoke and magnet, and being vibrated by the excitation of the coil;

the lead terminals formed of the same material as the yoke, fixed to the base, connected to ends of the coil and projecting outside the case; and said yoke and said lead terminals formed of a common lead frame made of a single metal material.

2. An electroacoustic transducer according to claim 1, wherein the core is formed integrally with the yoke so as to protrude from the yoke.

3. An electroacoustic transducer according to claim 1, wherein the core is formed separately from the yoke and fixedly attached to the yoke.

4. An electroacoustic transducer according to claim 1, wherein a magnetic piece is attached to the diaphragm to increase the vibrating mass of the diaphragm.

5. A method of fabricating an electroacoustic transducer for converting electric input signals into sound, said method comprising:

forming lead terminals and a yoke by a common lead frame made of a single metal material and forming a core integrally with the yoke;

forming a base of a synthetic resin on the lead frame by molding so that the yoke and the lead terminals are fixed to the base;

winding a coil around the core formed integrally with the yoke, and connecting ends of the coil to the lead terminals, said winding and connecting being carried out on the lead frame;

mounting a support ring on the yoke, fitting a magnet in the support ring and placing a diaphragm on the support ring, said mounting, fitting and placing being carried out on the lead frame;

placing a case on and fixedly joining the same to the base, said placing being carried out on the lead frame; and cutting tie bars of the lead frame extending from the yoke and the lead terminals to separate the electroacoustic transducer from the lead frame.

6. A method of fabricating an electroacoustic transducer, according to claim 5, wherein the core is formed integrally with the yoke so as to protrude from the yoke.

7. A method of fabricating an electroacoustic transducer, according to claim 5, wherein the core is formed separately from the yoke and fixedly attached to the yoke in a forced fit.

8. A method of fabricating an electroacoustic transducer, according to claim 5, wherein the coil is formed by winding a wire around a bobbin mounted on the core.

9. A method of fabricating an electroacoustic transducer, according to claim 5, wherein the coil is formed by winding a wire around a bobbin, and then the bobbin holding the coil is mounted on the core.

* * * * *